United States Patent [19]

Epstein

[11] 4,169,920

[45] Oct. 2, 1979

[54] HERMETICALLY SEALED ELECTROCHEMICAL BATTERY

[75] Inventor: James Epstein, Sharon, Mass.

[73] Assignee: GTE Laboratories Incorporated, Stamford, Conn.

[21] Appl. No.: 967,950

[22] Filed: Dec. 11, 1978

[51] Int. Cl.² ............................................. H01M 6/14
[52] U.S. Cl. .................................. 429/154; 429/162; 429/181; 429/185
[58] Field of Search ............................ 429/149–155, 429/162, 163, 178, 181, 185, 194, 196, 199, 210, 218, 174

[56] References Cited

U.S. PATENT DOCUMENTS

| 3,488,220 | 1/1970 | Lyall et al. ........................... 429/218 |
| 3,907,593 | 9/1975 | Marincic ........................... 429/218 X |
| 4,042,756 | 8/1977 | Goebel et al. .................... 429/194 X |
| 4,047,292 | 9/1977 | Shaffer ................................. 429/181 |
| 4,117,300 | 9/1978 | Ricards ............................... 429/72 X |
| 4,121,020 | 10/1978 | Epstein et al. ........................ 429/162 |

*Primary Examiner*—Anthony Skapars
*Attorney, Agent, or Firm*—David M. Keay

[57] ABSTRACT

An ultra-thin button-type hermetically sealed battery containing two primary electrochemical cells of the lithium-carbon type. The battery includes two similar dish-shaped housing members having outwardly turned rims. The rims of the two housing members are welded to a thin flat collector member of the same diameter as the housing members to form a sealed enclosure of two chambers. Each chamber contains a carbon cathode, a lithium anode, insulating separators, and an appropriate electrolytic solution with the elements suitably arranged and mounted to provide two cells in series. Terminal members pass through the centers of the housing members and are insulated therefrom. One terminal member makes electrical contact to the cathode in one chamber and the other terminal member makes electrical contact to the anode in the other chamber. The battery has a diameter of approximately 25 millimeters and a thickness of about 3 millimeters.

6 Claims, 3 Drawing Figures

HERMETICALLY SEALED ELECTROCHEMICAL BATTERY

BACKGROUND OF THE INVENTION

This invention is related to primary electrochemical cells. More particularly, it is concerned with extremely thin hermetically sealed batteries.

Primary electrochemical cells are employed for a wide variety of applications and are commonly available in a variety of sizes and shapes. For certain applications it is required that a cell supply low currents over an extended period of time. Under these conditions it is frequently desirable that the cell be hermetically sealed to preclude the possibility of the contents escaping into the surrounding environment. In addition, for use in applications such as electronic watches a cell must be of very small size and of thin configuration.

Primary cells employing electrochemical systems utilizing alkali metal anodes, such as lithium, carbon cathodes, and electrolytes of a solute dissolved in an inorganic oxyhalide or thiohalide solvent have high discharge capacity and are of small size. One example of a battery of this general type is shown in U.S. Pat. No. 4,121,020 entitled "Ultra-Thin Button-Type Primary Electrochemical Cell" which issued to James Epstein and William P. Brissette on Oct. 17, 1978 and is assigned to the assignee of the present application. Another primary electrochemical cell employing the same electrochemical system is shown and described in application Ser. No. 870,429 filed Jan. 18, 1978 by James Epstein and Nikola Marincic entitled "Hermetically Sealed Button-Type Electrochemical Cell and Method for Making Same" and also assigned to the assignee of the present invention.

For certain types of applications, however, for example, electronic watches employing liquid crystal displays (LCD), a voltage of at least 6 volts is required to operate the liquid crystal display. In watches utilizing conventional types of power supplies a 1.5 volt silver-zinc cell is usually employed together with electronic circuitry to step up the voltage to the necessary level to operate the display. Electrochemical cells such as the lithium-carbon type described in the aforementioned patent and application have an output of 3.6 volts and thus do not provide the desired voltage levels.

SUMMARY OF THE INVENTION

A hermetically sealed electrochemical battery in accordance with the present invention is of ultra-thin configuration and produces output voltages so as to be particularly useful as a power source for LCD electronic watches. The electrochemical battery in accordance with the invention includes first and second generally similar dish-shaped housing members of conductive material, each of which has an outwardly turned rim. The two housing members and a thin flat conductive collector member are sealed together at the rims of the housing members to provide a hermetically sealed enclosure which includes a first chamber between the first housing member and the collector member and a second chamber between the second housing member and the collector member.

A first thin preformed cathode disc is located within the first chamber and adjacent to the first housing member and is electrically insulated therefrom. A first conductive terminal member passes through the center of the first housing member and is electrically insulated therefrom. The first conductive terminal member makes electrical contact to the first cathode disc to permit electrical connection thereto from the exterior of the enclosure. A first thin anode disc within the first chamber is in electrical contact with the collector member. A first thin porous separator is interposed between the first cathode disc and the first anode disc to prevent physical contact between them.

A second thin preformed cathode disc located within the second chamber is in electrical contact with the collector member. A second thin anode disc within the second chamber is positioned adjacent to the second housing member and is electrically insulated therefrom. A second conductive terminal member passes through the center of the second housing member and is electrically insulated therefrom. The second conductive terminal member makes electrical contact to the second anode disc to permit electrical connection thereto from the exterior of the enclosure. A second thin porous separator is interposed between the second cathode disc and the second anode disc to prevent physical contact between them. The first and second chambers contain liquid electrolytic solution in contact with the first cathode disc and the first anode disc and in contact with the second anode disc and the second cathode disc.

Figure 1:
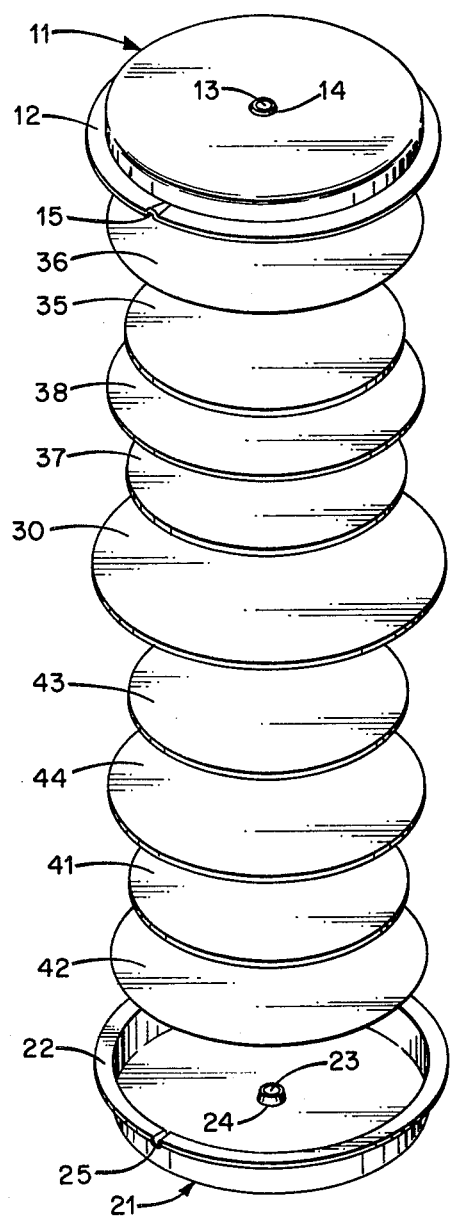
FIG. 1 is an exploded perspective view illustrating elements of the hermetically sealed battery in accordance with the present invention.

For a better understanding of the present invention, together with other and further objects, advantages, and capabilities thereof, reference is made to the following disclosure and appended claims in connection with the above-described drawings.

DETAILED DESCRIPTION OF THE INVENTION

A hermetically sealed electrochemical battery of ultra-thin configuration in accordance with the present invention is illustrated in the figures of the drawing. The battery includes a first dish-shaped housing member 11 of conductive material having a planar central portion and an outwardly turned rim 12. A conductive terminal member 13 passes through the center of the housing member and is insulated therefrom by an insulating ring 14 as of glass. A filling port 15 (FIG. 1) is also provided in the outer rim 12 for purposes to be explained hereinbelow. The battery also includes a second housing member 21 which is similar to the first housing member having a planar central portion with an outwardly turned rim 22, a conductive terminal member 23 arranged centrally of the housing member, and an insulating ring 24 sealing the terminal member in the housing member. An indentation in the rim provides a filling port 25.

Figure 2:
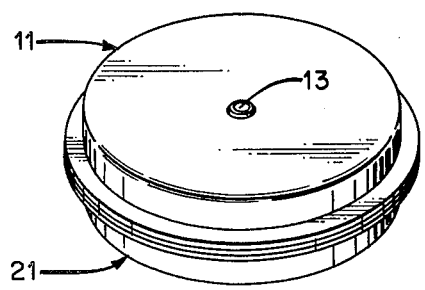
FIG. 2 is a perspective view of an assembled battery in accordance with the present invention.
Figure 3:
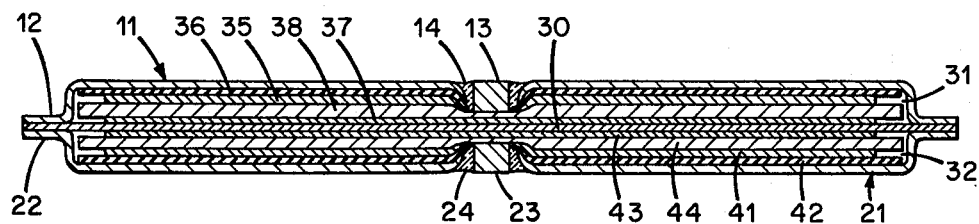
FIG. 3 is a cross-sectional view of an assembled electrochemical battery in accordance with the present invention.

An impervious, flat, planar, circular collector member 30 of conductive material, such as nickel or stainless steel, has approximately the same diameter as the outer diameter of the housing members 11 and 21. In the assembled battery as illustrated in FIGS. 2 and 3, the two housing members 11 and 21 and the collector member 30 are welded together. As can be seen in FIG. 3, the two housing members and the collector member provide a sealed enclosure containing two hermetically sealed chambers 31 and 32.

A first cathode 35 is mounted within the first chamber 31. The cathode is in the form of a preformed disc which may comprise such materials as graphite, carbon black, acetylene black, or an intercalation compound of carbon and fluorine represented by the general formula ($C_4F$). In one preferred form the cathode is a thin sheet-like disc including a mixture of graphite and carbon black particles and a mechanical binder on a metallic current collector which may be a nickel screen. The cathode 35 is insulated from the first metallic housing 11 by a thin layer of an insulating material 36 which may be of glass or glass fiber paper. An opening is provided centrally of the insulating disc 36 to accommodate the first terminal member 13. The cathode 35 is attached to the terminal member as by welding the current collector thereto so as to support the cathode and provide electrical contact between the cathode and terminal member.

A first anode 37 which may be of an alkali metal preferably lithium is in physical and electrical contact with the collector member 30. The anode structure may include a supporting metal grid of nickel or stainless steel welded to the collector member 30. A sheet of lithium is pressed into the grid. A separator 38 which is a thin, porous structure is interposed between the first cathode 35 and the first anode 37 to prevent physical contact between them. The separator may be constructed from such materials as thin sheets of glass fiber paper, non-woven porous polytetrafluoroethylene, or zirconia.

The second chamber 32 of the battery contains a second anode 21 similar to the first anode. The second anode makes electrical contact with and is supported on the second terminal member 23 as by welding a supporting metal grid thereto. The anode structure is insulated from the conductive metal housing member 21 by a thin disc of insulating material 42 having a central opening to accommodate the terminal member. A second cathode 43 similar to the first cathode is in physical and electrical contact with the collector member 30. Preferably the current collector of the cathode may be welded to the collector member 30 to support the cathode. A second separator 44 similar to the first separator 38 is positioned between the cathode 43 and the anode 41 to prevent physical contact between them.

After the elements of the battery as described hereinabove have been fabricated they are assembled together as indicated in FIG. 3. The rims 12 and 22 of the housing members 11 and 21, respectively, are welded to the collector member 30 except in the regions of the filling ports 15 and 25 (FIG. 1). The first and second chambers 31 and 32 are then filled with a suitable electrolytic solution by way of the ports 15 and 25. The rims in the regions of the ports are then welded to the collector member 32 to provide a completely hermetically sealed enclosure.

The electrolyte employed in the battery as described includes a liquid, covalent, inorganic, electrochemically reducible oxyhalide or thiohalide solvent as a depolarizer, and a solute dissolved in the solvent. The solute is electrochemically reduced on the surface of the cathode material during operation of the battery whereby the solvent in conjunction with the oxidizable anode material is utilized as a source of electrical energy. An effective quantity of a suitable liquid depolarizer which can be electrochemically reduced on the surface area of the carbon cathode is included within each chamber of the battery and is in contact with both the anode and the cathode. Because of the porosity of the cathode material and of the separators, the depolarizer is diffused throughout both these elements. The choice of a depolarizer is dictated by the particular anode material employed. When the anode is lithium, it is preferred that the liquid depolarizer be an inorganic oxyhalide of phosphorous or sulfur, particularly one which is selected from the group consisting of phosphorous oxychloride, thionyl chloride, and sulfuryl chloride. A suitable solute is a salt such as lithium tetrachloroaluminate or a Lewis acid such as antimony pentachloride in conjunction with lithium chloride. Further details of the electrochemical system employed in the battery of the present invention including materials which may be utilized are described in U.S. Pat. Nos. 3,907,593, 4,042,756, and 4,121,020 which are assigned to the assignee of the present invention.

The battery as illustrated and described herein is an extremely thin combination of two electrochemical cells in series within a single enclosure. The maximum thickness of the battery is approximately 3 millimeters and the diameter at the rims is approximately 25 millimeters. The battery employing the lithium-carbon system as described provides a total battery voltage of 7.2 volts between the two terminal members 13 and 23. The voltage at the first terminal member 13 is +3.6 volts with respect to the housing, in particular with respect to the rim of the housing which readily may serve as a terminal. The voltage at the second terminal member 23 is −3.6 volts with respect to the terminal provided by the rim of the housing.

Batteries as described are particularly useful as power sources for operating electronic watches employing LCD displays. A relatively high voltage (7.2 volts) is available for operating the LCD display, and relatively low voltages (3.6 volts) are available for operating electronic circuitry. The necessary voltages are provided without the need for incorporating the components of an electronic upconverter. In addition, the battery is extremely thin permitting design of a watch with a very thin profile. A battery in accordance with the present invention and of the dimensions described provides sufficient discharge capacity to operate an LCD electronic watch for approximately three years.

While there has been shown and described what is considered a preferred embodiment of the present invention, it will be obvious to those skilled in the art that various changes and modifications may be made therein without departing from the invention as defined by the appended claims.

What is claimed is:

1. A hermetically sealed electrochemical battery comprising
    first and second generally similar dish-shaped housing members of conductive material, each having an outwardly turned rim;
    a thin, flat, conductive collector member;
    the first and second housing members and the collector member being sealed together at the rims of the housing members to provide a hermetically sealed enclosure including a first chamber between the first housing member and the collector member and a second chamber between the second housing member and the collector member;

a first thin preformed cathode disc within the first chamber adjacent to said first housing member and electrically insulated therefrom;

a first conductive terminal member passing through said first housing member centrally thereof and electrically insulated therefrom, and making electrical contact to said first cathode disc to permit electrical connection thereto from the exterior of the first chamber;

a first thin anode disc within the first chamber in electrical contact with the collector member;

a first thin porous separator interposed between the first cathode disc and the first anode disc to prevent physical contact therebetween;

a second thin preformed cathode disc within the second chamber in electrical contact with the collector member;

a second thin anode disc within the second chamber adjacent to said second housing member and electrically insulated therefrom;

a second conductive terminal member passing through said second housing member centrally thereof and electrically insulated therefrom, and making electrical contact to said second anode disc to permit electrical connection thereto from the exterior of the second chamber;

a second thin porous separator interposed between the second cathode disc and the second anode disc to prevent physical contact therebetween; and liquid electrolytic solution in said first chamber in contact with the first cathode disc and the first anode disc and in said second chamber in contact with the second cathode disc and the second anode disc.

2. A hermetically sealed electrochemical battery in accordance with claim 1 including a first thin layer of insulating material between the first cathode disc and the first housing member; and a second thin layer of insulating material between the second anode disc and the second housing member.

3. A hermetically sealed electrochemical battery in accordance with claim 2 wherein the first and second thin, preformed cathode discs are of porous carbon;

the first and second thin anode discs are of an alkali metal; and the liquid electrolytic solution includes a solute dissolved in an inorganic oxyhalide or thiohalide solvent.

4. A hermetically sealed electrochemical battery in accordance with claim 3 wherein the first and second anode discs include lithium;

the solvent of the liquid electrolytic solution is selected from the group consisting of phosphorous oxychloride, thionyl chloride, sulfuryl chloride, and mixtures thereof; and the solute of the liquid electrolytic solution is selected from the group consisting of lithium tetrachloroaluminate, and antimony pentachloride in conjunction with lithium chloride.

5. A hermetically sealed electrochemical battery in accordance with claim 4 wherein the periphery of the rims of the first and second housing members are substantially circular;

the periphery of the collector member is substantially circular and substantially equal to the rims of the first and second housing members; and the collector member is positioned between the rims of the first and second housing members with the rims welded to the collector member to provide a hermetically sealed enclosure.

6. A hermetically sealed electrochemical battery in accordance with claim 5 wherein the diameter of the battery at the rims of the housing members is approximately 25 millimeters; and the maximum thickness of the battery is approximately 3 millimeters.

* * * * *